United States Patent [19]

Simonton

[11] Patent Number: 4,554,226
[45] Date of Patent: Nov. 19, 1985

[54] FLAT CELL BATTERY CONNECTOR SEAL

[76] Inventor: Robert D. Simonton, 1900 Hampton Rd., Fremont, Ohio 43420

[21] Appl. No.: 715,779

[22] Filed: Mar. 26, 1985

Related U.S. Application Data

[63] Continuation of Ser. No. 540,021, Oct. 7, 1983, abandoned.

[51] Int. Cl.⁴ .............................................. H01M 6/46
[52] U.S. Cl. .................................... 429/153; 429/160
[58] Field of Search .............. 429/151, 149, 152, 153, 429/154, 155, 159, 99

[56] References Cited

U.S. PATENT DOCUMENTS

| | | | |
|---|---|---|---|
| 2,463,089 | 3/1949 | Deibel | 429/153 |
| 2,745,894 | 5/1956 | Nowotny, II | 429/154 |
| 2,793,244 | 5/1957 | Grinten | 429/153 |
| 2,798,895 | 7/1957 | Nowotny | 429/153 |
| 3,306,777 | 2/1967 | Reid et al. | 429/153 |
| 3,347,709 | 10/1967 | Taylor et al. | 429/153 |
| 4,060,670 | 11/1977 | Tamminen | 429/154 |

Primary Examiner—Donald L. Walton
Attorney, Agent, or Firm—David H. Wilson

[57] ABSTRACT

A battery construction for primary cells of the type comprising a sealed flexible plastic envelope containing electrolyte and the active cell elements wherein an external electrical connection comprises a connector plate within the envelope and that connector pierces the envelope. A seal against the loss of electrolyte from the envelope through the connector aperture is achieved by locating the extension of the connector on the collector plate with portions of the face thereof surrounding it, by forming an adhesive bond between the adjacent inner face of the envelope and the collector plate surrounding the connector extenion, and by imposing external pressure on the adhesive bond by means of a pad which conforms to the envelope and imposes pressure over the bond. The pad is shown as a resilient, elastomeric, sponge sheet positioned between the cell envelope and battery casing.

10 Claims, 5 Drawing Figures

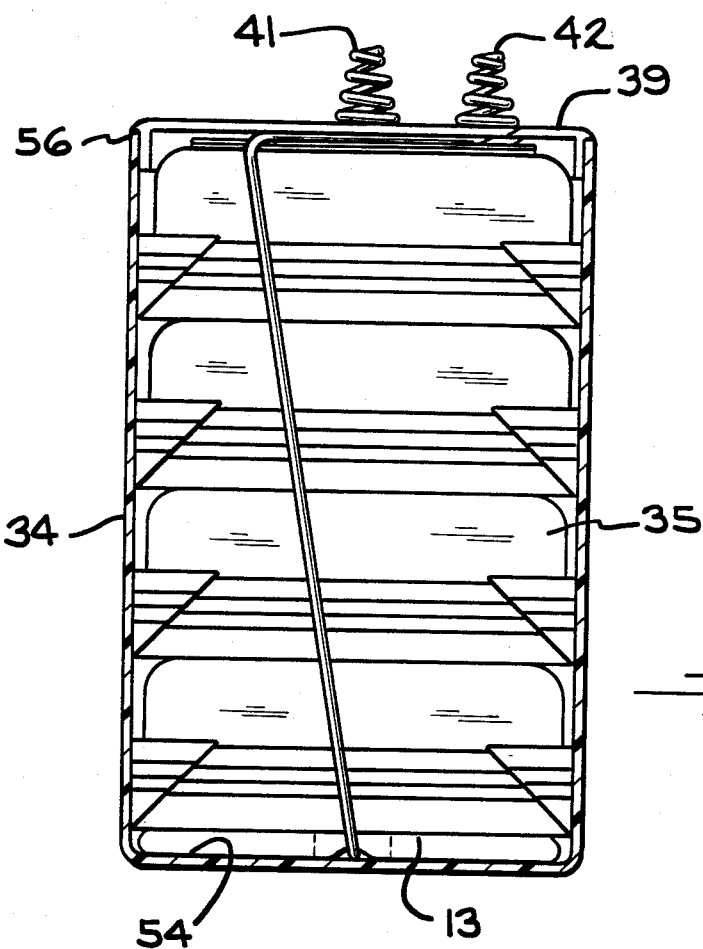
FIG. 3
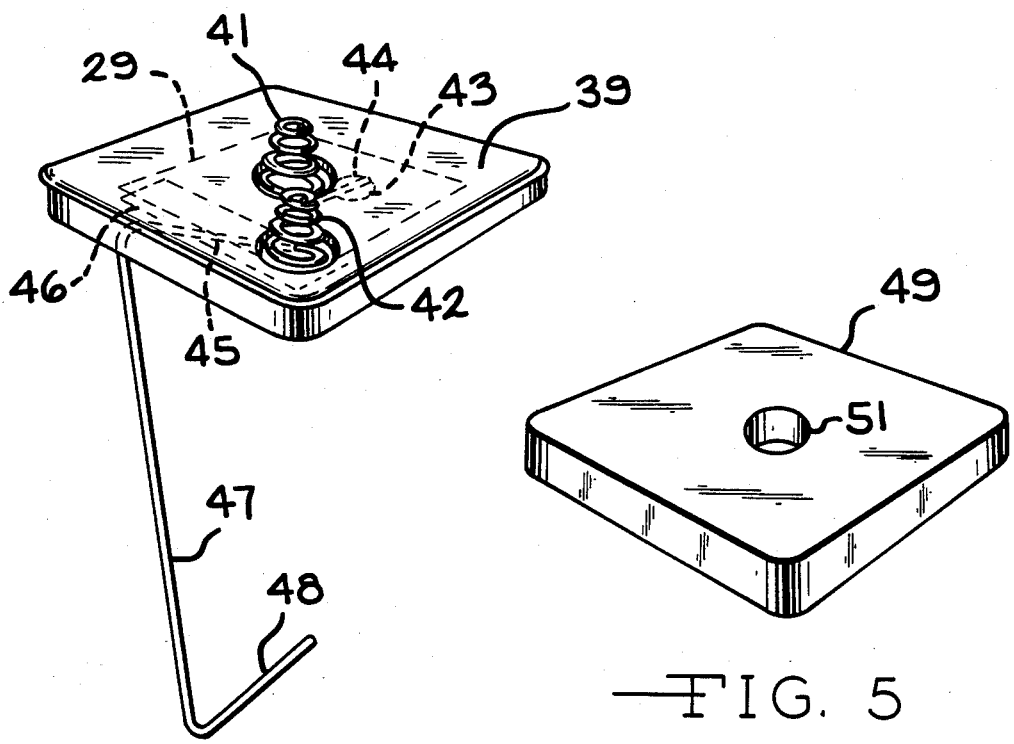
FIG. 4
FIG. 5

FLAT CELL BATTERY CONNECTOR SEAL

This application is a continuation, of application Ser. No. 540,021, filed Oct. 7, 1983, now abandoned.

This invention relates to a flat cell battery and more particularly to the connector seals for flat cells fabricated in pouch form wherein the sheet of flexible material and the active elements of the cell have connections which pass through the flexible material.

In Nowotny U.S. Pat. No. 2,745,894 a cell is shown comprising outer sheets of a non-conductive plastic of chlorinated rubber film bonded together at their peripheries by an adhesive which is coated over at least the periphery of the inner face of each sheet to form a pouch enveloping all of the elements of a primary cell and containing the electrolyte of the cell. The cell elements comprise an electrode in the form of a metal sheet, separated from a cake of depolarizer mix by a suitable electrolyte carrier which may be a sheet of fibulous paper. A sheet of conductive plastic is positioned against the electrode of the cell and a metallic collector plate is positioned against the opposite face of the conductive plastic. Current flow communication is established from the exterior of the cell to its interior components by means of pointed conductive elements which puncture the non conductive plastic walls to engage the respective electrodes or their collector plates. The plastic sheet walls are self sealing in the region pierced by the cell connectors by means of an adhesive coating on the plastic.

An alkaline flat cell battery hermetically sealed within plastic sheets is disclosed in Tamminen U.S. Pat. No. 4,060,670. That cell has metal current collector sheets on its outer faces immediately underlying the plastic sheets. Connections to the elements within the sealed plastic envelope are made with contact elements formed as metallic spring elements resiliently compressible in a direction perpendicular to the contact area of the cell when their end engages one of the metal collector plates. The contact elements have pointed ends which pierce a chemically inert, water repellant adhesive on the metal plates which is compressed against and heat sealed to the plastic envelope sheets to form a seal against electroyte leakage at the point of penetration of the envelope sheet.

Published UK patent application No. 2 097 574 application No. 8210940 filed Apr. 15, 1982 by P. Tamminen for "Contact Arrangement for a Galvanic Battery", which corresonds to U.S. Ser. No. 368,540, also discloses a pouch type cell envelope assembled in a stack where the cells are interconnected by connectors adapted to penetrate the pouch wall of an adjacent cell.

In each of the aforenoted constructions the cells, when assembled in a battery stack are subjected to a compressive force by means of tape, straps, or rubber rings which is placed around the stack while it is constrained between dies or the like. The pressure imposed by these arrangements is employed as the means of causing and maintaining pentration of the envelope wall by a connector element adapted for such pentration to establish electrical connections between cells or a cell and a terminal. Adhesive at the point of engagement of the connector elements is relied upon as the means of sealing against electolyte leakage from within the cell.

In the present construction an enhanced seal is realized and an improved assembly of cells into a battery is achieved by utilizing the casing for the stack of cells of the battery as a containment mechanism against which a resilient element reacts to apply and maintain compressive force on the stack and a distributed pressure on the major portion of the face of a positive collector plate underlying an exposed cell end. When combined with broad area hot melt adhesive pads between cell envelopes and between collector plates and cell envelopes, this distributed and maintained compresive force on the stacked cells enhances the seal of the pads against electolyte loss.

The above and additional features of the invention will be appreciated more fully from the following detailed description of the invention when read with reference to the accompanying drawings in which:

FIG. 3 is a side elevation of an encased battery comprising the stack of FIG. 2 with portions of the casing broken away to reveal the relatioship of the elements;

FIG. 4 is a perspective view of a battery casing cover assembly as employed in FIGS. 2 and 3; and FIG. 5 is a perspective view of a compression pad for a seal according to this invention.

Figure 1:
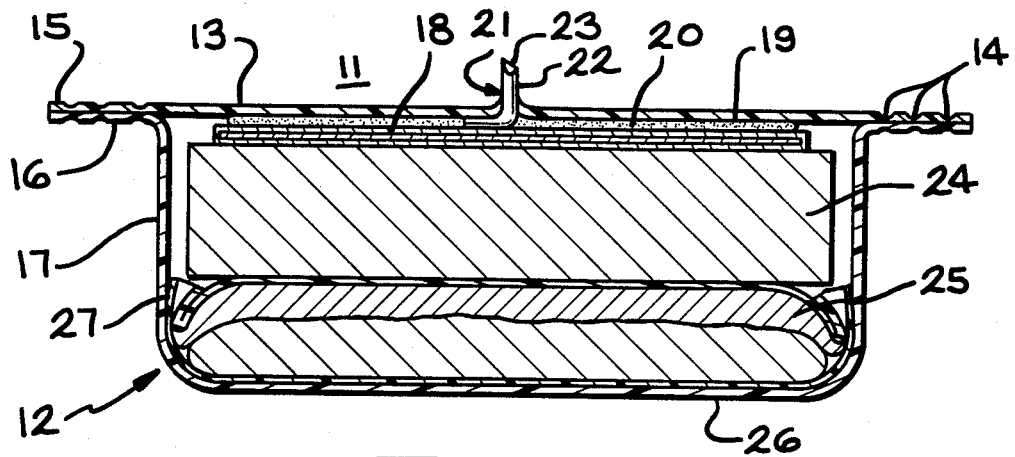
FIG. 1 is a simplified schematic in sectioned elevation of a flexible pouch enclosed primary cell of a type suitable for incorporation in a battery casing according to this invention.

A typical cell is shown in FIG. 1 to comprise an envelope 11 made up of a thermoformed cup 12 of a pliant, electrolyte impervious, plastic sheet closed by a cover 13 as by a fusion bond 14 between the perimeter 15 of the cover 13 and a flange 16 extending outwardly from the sidewalls 17 of cup 12. A positive current collector plate in the form of a metal plate 18 of less lateral extent than the cup 12 is sealed at its face 20 to the inner face of cover 13 by a layer of adhesive 19 and has a connector 21 welded to the plate and bent to an L shape with the upstanding body 22 of the L having a sharpened end 23 which pierces the adhesive layer 19 and cover 13 to provide an external connection to the cell.

A positive electrode mass 24 which may be a tablet or cake is immediately adjacent and, as viewed in FIG. 1, below the collector plate 18 in good electrical communication with that plate. Below the positive electrode mass is a separator negative electrode mass 25 which may be a pouch subassembly of the type diclosed in the U.S. patent application Ser. No. 539,827 of Robert D. Simonton entitled "Primary Flat Cell" now U.S. Pat. No. 4,505,996 (R. D. Simonton 2) filed herewith. The separator-negative electrode mass is made up of flexible and compliant sheets of separator material as an upper pouch wall which absorbs and retains electrolyte, a putty like negative electrode mass of a zinc powder with mercury in a gel of potassium hydroxide and zinc oxide and carboxymethylcellulose, and a lower pouch wall of flexible and compliant sheet material such as polyethylene bonded to the upper wall at margins 27 surrounding and encasing the electrode mass. The separator-electrode mass subassembly 25 fits within the bottom 26 of cup 12 and conforms thereto with its margins 27 turned inward along the walls 17.

In assembly of a cell, the separator-electrode mass 25 is placed in cup 12, tablet 24 is placed thereon and the cup is filled with electrolyte. The cover 13 with collector plate 18 bonded thereto is mounted on the cup flange 16 with the plate juxtaposed the positive tablet 24 and in registry therewith so that the cover margins 15 register with the flange 16. The assembled elements are vacuum sealed by drawing a vacuum of twenty-eight to thirty inches of mercury and applying a heated seal head (not shown) to form a continuous bond 14 around the flange and margins.

When incorporated into a stack, the cells are pierced in the bottom 26 of cup 12 by connector 21 of the next adjacent cell to electrically connect the positive tablet 24 of the cell to the negative electrode mass within 25. That cell having its cup bottom 26 at the end of the stack is provided with an external negative collector plate 29 having a connector 31 corresponding to connector 21 which pierces the cup bottom. An adhesive sealant mass 32 is applied to each cup bottom immediately preceeding the incorporation of the next adjacent cell in the stack assembly. The connector 21 or 31, as the case may be, is advanced through the adhesive sealant mass 32. The bottom of cup 12 and into the negative electrode mass in 25.

In alkaline cells of the structure defined, the envelope 11 can be made up of a laminated sheet having an external lamina of nylon and an internal lamina of ethylene vinyl acetate. An effective adhesive on this sheet is a butadiene based elastomeric hot melt designated HM 8346 supplied by H. B. Fuller Co., Assembly Products Division, 5220 Main St. N.E., Minneapolis, Minn. 55421. That hot melt adhesive can be employed to bond cover 13 to plate 18 and the exterior of cover 13 to the bottom 26 of next adjacent cup 12 or negative collector plate 29, as the case may be.

When the electrolyte is potassium hydroxide, there is a strong tendency for it to seek to migrate to the positive connector and escape the cell envelope at the aperture through which the connector passes. A substantial reduction in such leakage is accomplished by coating the metal plate surface 20 to which the hot melt 19 is applied with a paint which is resistant to attack by the electrolyte, potassium hydroxide in the example, and is bondable with the adhesive hot melt 19. One such paint which also enhances the electrical characteristics of the cell by enhancing current flow from the positive electrode, tablet 24, and can be applied to both surfaces of positive collector plate 18 in a single operation is a conductive paint (not shown) which is a dispersion of finely divided graphite in a thermoplastic resin such as polyvinyl chloride diluted with lacquer thinner, available from Acheson Colloids Company, Port Huron, Mich. 48060 as Electrodag ® 109, as disclosed in R. D. Simonton, U.S. patent application Ser. No. 540,022 entitled "Connector Aperture Seal for a Galvanic Cell and Method of its Fabrication" filed herewith now U.S. Pat. No. 4,525,439.

Hot melt adhesive 32 is employed to augment the electrolyte barrier of the envelope wall tightly embracing the body 22 of connector 21 or connector 31.

It has been found that the seals at the point of passage through the envelope walls of both the positive and negative connectors is enhanced by the application and maintenance of pressure on the hot melt areas throughout the life of the battery. In particular the potassium hydroxide electrolyte is inhibited from entering between the face 20 of the metal collector plate 18 adjacent cell envelope cover 13 and the bond to cover 13 when pressure is maintained over the interface of that bond. While the taped or banded compression imposed on cell stacks of the prior art developed a degree of compression between stacked cells it did not distribute such compression over the surface of the end of the stack from which the positive connector to the positive terminal of the battery was connected.

Figure 2:
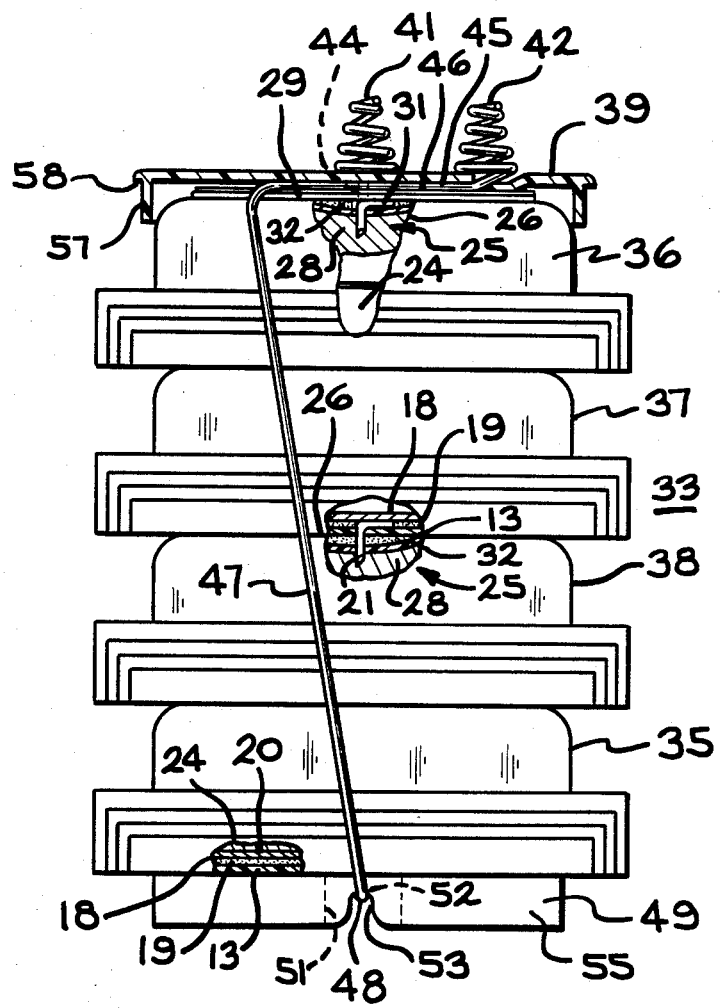
FIG. 2 is a side elevation of a stack of cells of the type shown in FIG. 1 connected in series relationship with portions broken away to illustrate the compressed adhesive connector seal.

A battery stack 33 of cells is shown in FIG. 2 wherein the several cells of the stack are shown assembled for insertion in a casing 34 as shown in FIG. 3. The stack includes a positive end cell 35 a negative end cell 36 and intermediate cells 37 and 38 all of the structure and form shown in FIG. 1 inverted to locate the bottom 26 of the envelope of the negative end cell 36 at the top of the stack. The interconnection between the cells is by means of connector 21 through the penetration of its sharpened end 23 being forced through an adhesive mass 32 and the bottom 26 of the next adjacent cell so that it enters and makes electrical contact with the negative electrode 28 in separator-electrode pouch 25 of that next adjacent cell. Thus cell 36 is connected to cell 37, cell 37 is connected to call 38 and cell 38 is connected to cell 35.

A negative connection to the battery stack 33 is provided by the penetration of the bottom 26 of cell 36 by the sharpened end of connector 31 extending from collector plate 29. An adhesive mass 32 is intermediate plate 29 and the exterior of bottom 26 of cell 36. A battery case cover 39 having a negative terminal 41 and a positive teminal 42 each in the form of a frustoconical helix of resilient wire riveted to the cover overlies the negative collector plate 29 and is secured thereto by a mechanical and electrical conection 43 from an internal extension 44 of negative terminal 41. Connection 43 can be made to plate 29 by soldering or welding as shown in FIG. 4 prior to the application of plate 29 to stack 33.

Positive terminal 42 includes internal extension 45 which parallels the innerface of cover 39 and is insulated from plate 29 as by a sheet of insulating plastic 46, conveniently adhesively bonded to plate 29 along the side of the face thereof proximate the positive terminal 42. A side continution 47 of the internal extension 45 of positive terminal 42 extends obliquely along the side of the stack 33 to its bottom and has an end length 48 turned inwardly to the center of the stack for electrical and mechanical connection to connector 21 of positive end cell 35.

A compression pad 49 is provided on the outer face of the positive end cell 35. The pad applies a uniform pressure over the otherwise free outerface of cover 13 for cell 35, thereby enhancing the seal of the face 20 of positive collector plate 18 to the inner face of cover 13 at the adhesive bond 19 and the paint inteface on face 20. Compression pad 49 is of the general lateral extent of plate 18 and has a central aperture 51 permitting an electrical and mechanical connection 52 to be made between end length 48 of the conductor to positive battery terminal 42 and connector 21 at the positive end of battey cell stack 33.

Pad 49 is of resilient, compressible material of sufficient thickness to develop and maintain the desired pressure on cover 13 of cell 35, its cover 13 to collector plate interface 20 and the adhesive bond 19 therebetween, and the stack of cells when inserted in casing 34 and compressed. In practice it has been found that a force of about six to ten pounds imposes adequate pressure to assure an effective seal. Such force has been developed with sponge sheet natural rubber, neoprene, urethane or other resilient elastomeric material having a temperature compression set characteristic at a temperature above that to which the battery will be exposed, 160° F. in one application. In the exemplary B battery a pad 49 which was of a natural rubber sponge having resilience such that it compesses 65% in thickness under a pressure of 2.1 psi was provided with a thickness of three eights of an inch and was of the generally square form shown in FIG. 5 one and seven eighths inch on a side with a half inch diameter circular connection aperture 51. This pad was compressed to about fifty percent of its unconstrained thickness, to about three-sixteenths of an inch, in the finished battery to achieve the six to ten pound compressive force.

Compression of pad 49 is achieved between the inner face 54 of the bottom of casing 34 and the outer face of cover 13 for cell 35. The conductor inteconnecting connector 21 and positive terminal 42 is arranged to avoid interference with the force developed at casing 54 by its oblique orientation along the side of stack 33 and its length which is such as to compress the portion 53 of pad 49 between it and cover 13 of cell 35 to a somewhat greater degree than the anticipated compression by face 54.

In assembling the cell stack 33, pad 49 is placed on cover 13 of cell 35 and the preformed conductor 45, 47 and 48 is positioned so that end length 48 is on the outer face 55 of pad 49, the face adapted to be engaged with casing bottom 54, and compressed the underlying portion 53 of pad 49. An electrical and mechanical connection is made between end lengths 48 and connector 21 as by soldering or welding at pad aperture 51 to complete the connection of case cover 39 and its terminal 41 and 42 to cell stack 33.

An assembled stack as illustrated in FIG. 2 with its case cover 39 and compression pad 49 is advanced into the casing 34 to seat the pad against bottom face 54. A force is then imposed on cover 39 to compress pad 49 and cause the upper lip 56 of the casing to receive and enclose skirt 57 on the margin of the cover. Cover 39 has a seat 58 exterior of skirt 57 for receiving the casing lip 56. With lip 56 seated against seat 58 the exemplary cover, stack and pad are placed under about fifteen pounds of compressive force. While maintained in this state, the lip region 56 and seat 58 and/or skirt 57 can be secured together as by ultrasonically welding them together. A weldable plastic enclosure is thus formed which has negligible deflection and thus permits an insignificant amount of relaxation of compressed pad 49 and release of pressure on envelope cover 13.

The assembly of the cell stack 33, case cover 39 and compression pad 49 as shown in FIG. 2 can be constructed to provide a range of compressive forces through selection of the height of the relatively incompressible stack and cover and the thickness and resilience of the compresion pad relative to the ultimate height of that assembly when secured in the casing 34. Thus the relative height of the casing is a design factor in the arrangement illustrated although other means of effecting compression such as the addition of incompressible inserts either at the top of the assembly as between plate 18 and cover 39 or at the bottom as between the casing bottom face 54 and compression pad 49 can be employed. The compliance of pad 49 to the exterior of cover 13 on positive end cell 35 to distribute the compressive force as a uniform pressure over the cover—positive collector plate bonded interface is a advantageous feature of the construction since it enables the imposition of uniform compressive force on the bonded interface between the inner face of the envelope and the collector plate face 20 surrounding the area of the envelope pierced by the connector 21.

It is to be appreciated that certain advantages of the imposition of pressure on the envelope-plate adhesive bond can be achieved with a compliant pad applied to the exterior of the envelope in the region surrounding the area pierced by connector 21 to distribute the compressive force thereon while another element provides that force. Also the invention can be utilized in single cell batteries wherein external current collector plate 29 and its connector 31 are applied to the cell on which the compliant pad is pressed. Thus, variants of the invention are apparent without departing from its spirit and scope.

What is claimed is:

1. An alkaline cell comprising a sealed, flexible, sheet plastic, non-conductive evelope, having spaced, generally parallel, major walls; alkaline electrolyte within said evelope; a rigid conductive plate within said envelope having a major face adjacent an inner face of one of said major walls of said envelope of a lateral extent generally conforming to and slightly less than said face of said one major wall; a connector conductively joined to said conductive plate and extending from the central region of said major face through said one major wall of said envelope at a central region thereof, said one major wall engaging said connector portion passing therethrough; an adhesive bond between said major face of said plate and said adjacent inner face of said one major wall of said envelope surrounding said extending connector and substantially coextensive with said major face of said plate; a continuously compressed resilient pad on the exterior of said one major wall of said envelope, said pad being substantially coextensive with said adhesive bond and surrounding said extended connector; and means to maintain said resilient pad compressed to apply generally uniform pressure through said resilient pad over the coextensive areas of said one major wall of said envelope, said adhesive bond and said conductive plate.

2. A combination according to claim 1 wherein the means to maintain said resilient pad compressed is a body having a surface coextensive with said pad and bearing on the face of said pad opposite the face bearing on the exterior of said one major wall of said envelope.

3. A combination according to claim 1 wherein said pad is a sheet of elastomeric sponge material.

4. A combination according to claim 1 including a battery casing containing said primary dry cell and having a wall comprising said means to maintain said resilient pad compressed.

5. A combination according to claim 4 wherein said casing comprises a first and second end wall and sidewalls joining said first and second end walls and wherein one of said end walls bears on the face of said pad, the other of said end walls constrains said cell envelope on an exterior wall of said envelope opposite the face engaged by said pad, and said side walls of said casing cooperate with said end walls to maintain said pad compressed.

6. A combination according to claim 1 wherein said conductive plate is a positive current collector and said connector provides the positive connection to said battery.

7. A combination according to claim 6 wherein said pad is a sheet of resilient elastomeric sponge material.

8. A combination according to claim 7 wherein said bond comprises a layer of an elastomeric hot melt adhesive and said plate face is coated with a material bondable to said adhesive and which is resistant to attack by said electrolyte.

9. A combination according to claim 8 wherein said electrolyte is potassium hydroxide and including a battery casing contacting said primary dry cell and having a wall engaging said pad on the face of said pad spaced from said envelope to apply compresive force on said pad.

10. A combination according to claim 7 including a battery casing contacting said primary dry cell and having a wall engaging said said pad on the face of said pad spaced from said envelope to apply compressive force on said pad.

* * * * *